(12) United States Patent
Murayama

(10) Patent No.: US 6,360,164 B1
(45) Date of Patent: Mar. 19, 2002

(54) NAVIGATION SYSTEM

(75) Inventor: Kyohei John Murayama, 1-5-1-615, Okubokita, Kumatori-cho, Sennan-gun, Osaka (JP)

(73) Assignees: Ascii Corporation, Tokyo; Kyohei John Murayama, Osaka, both of (JP)

( * ) Notice: Subject to any disclaimer, the term of this patent is extended or adjusted under 35 U.S.C. 154(b) by 0 days.

(21) Appl. No.: 09/450,111

(22) Filed: Nov. 26, 1999

(30) Foreign Application Priority Data

Nov. 27, 1998 (JP) .......................................... 10-338269

(51) Int. Cl.⁷ .............................................. G01C 21/00
(52) U.S. Cl. ....................... 701/200; 701/201; 701/209; 701/211; 455/456
(58) Field of Search ................................ 701/200, 207, 701/208, 209, 211, 213, 117; 707/104; 340/988, 990, 995; 455/31.1, 31.2, 403, 550, 556, 456, 557; 434/307 R; 705/14

(56) References Cited

U.S. PATENT DOCUMENTS

| | | | |
|---|---|---|---|
| 5,406,492 A | * 4/1995 | Suzuki ........................ | 701/211 |
| 5,524,169 A | * 6/1996 | Cohen et al. ............... | 704/231 |
| 5,664,948 A | * 9/1997 | Dimitriadis et al. .... | 434/307 R |
| 5,682,525 A | * 10/1997 | Bouve et al. ............... | 707/104 |
| 5,742,509 A | * 4/1998 | Goldberg et al. ........... | 701/211 |
| 5,938,721 A | * 8/1999 | Dussell et al. .............. | 701/211 |
| 5,987,381 A | * 11/1999 | Oshizawa .................... | 701/209 |
| 6,021,371 A | * 2/2000 | Fultz ........................... | 701/200 |

(List continued on next page.)

FOREIGN PATENT DOCUMENTS

| | | |
|---|---|---|
| JP | 2-288537 | 11/1990 |
| JP | 4-314248 | 5/1992 |
| JP | 5-334373 | 12/1993 |
| JP | 6-309378 | 4/1994 |
| JP | 7-143232 | 6/1995 |
| JP | 09-68566 | 3/1997 |
| JP | 9-178507 | 7/1997 |
| JP | 10-255197 | 9/1998 |
| JP | 10-275296 | 10/1998 |
| WO | WO 96/07110 | 3/1996 |

OTHER PUBLICATIONS

Murayama et al Asahi Soken Report pp. 101–109 Aug. 1, 1998 "Technological possibility of using seven–digit zip cord—Consideration of applying for a code system os district names—" and abstract.

Murayama et al Japanese J. of Computer Sci. vol. 5, No. 1, pp. 43–49, 3/99 "A proposal of a geological information system using new zip cord" and abstract.

*Primary Examiner*—Jacques H. Louis-Jacques
(74) *Attorney, Agent, or Firm*—Nixon & Vanderhye P.C.

(57) ABSTRACT

A navigation system 1 is provided with a present spot locating section 50 for receiving location information on a present location sent by dual-tone multi-frequency signals from a terminal device 2 and searching through longitude/latitude data 62 therein to obtain longitudinal and latitudinal data on the present location; a destination spot locating section 51 for receiving location information on a destination location sent by dual-tone multi-frequency signals from the terminal device 2 and searching through longitude/latitude data 62 therein to obtain longitudinal and latitudinal data on the destination location; and a location computation section 52 for computing distance and/or direction between the present location and the destination location based on the longitudinal and latitudinal data on the present and destination locations, and providing a voice report of computed results to the terminal device 2. The navigation system 1 is further provided with an advertisement processing section 54 for transmitting commercial voice messages contained in the advertising message data.

3 Claims, 10 Drawing Sheets

U.S. PATENT DOCUMENTS

| | | | |
|---|---|---|---|
| 6,073,075 A | * | 6/2000 | Kondou et al. .............. 701/203 |
| 6,091,956 A | * | 7/2000 | Hollenberg ................. 455/456 |
| 6,107,944 A | * | 8/2000 | Behr et al. .................. 340/995 |
| 6,108,631 A | * | 8/2000 | Ruhl ......................... 704/270 |
| 6,118,389 A | * | 9/2000 | Kamada et al. ............. 340/995 |
| 6,123,259 A | * | 9/2000 | Ogasawara et al. ......... 235/380 |
| 6,157,814 A | * | 12/2000 | Hymel et al. ............... 455/31.1 |
| 6,169,955 B1 | * | 1/2001 | Fultz ......................... 701/200 |
| 6,185,501 B1 | * | 2/2001 | Sumizawa .................. 701/209 |
| 6,199,010 B1 | * | 3/2001 | Richton ...................... 701/206 |
| 6,199,045 B1 | * | 3/2001 | Giniger et al. ................. 705/1 |

* cited by examiner

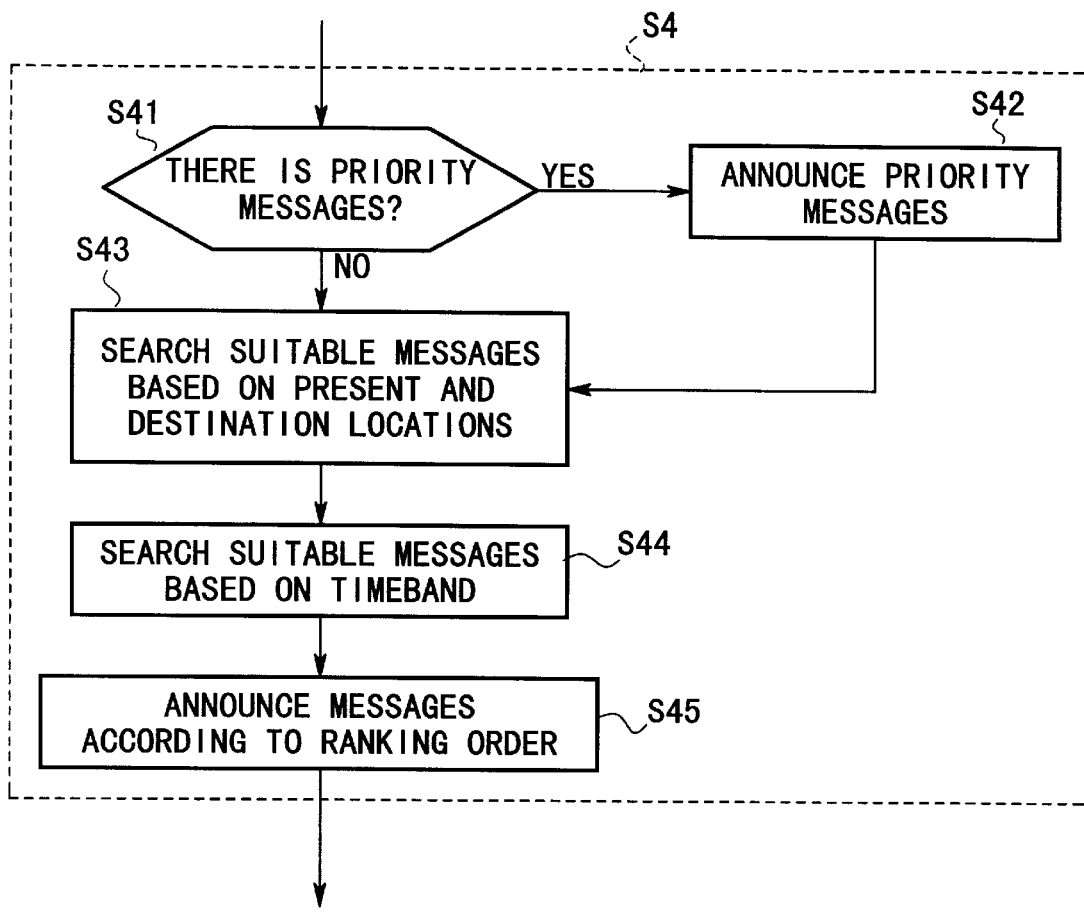

NAVIGATION SYSTEM

BACKGROUND OF THE INVENTION

1. Field of the Invention

The present invention relates to a navigation system and a navigation method that provides voice-guidance through a terminal device, such as a telephone, connected to a public circuit and able to transmit dual-tone multi-frequency (DTMF) signals, and also to a computer program product recorded on a recording medium containing the programs for executing the navigation processes.

This application is based on a patent application No. Hei 10-338269 filed in Japan, the content of which is incorporated herein by reference.

2. Description of the Related Art

It is sometimes difficult for a tourist arriving at a station near a destination to reach the actual intended spot, for example, when the traveler is not familiar with the local routes to the destination spot. A portable navigation system can provide aid in such a circumstance.

A portable device based on the global navigation system (GPS) is an example of such a portable navigation system. The GPS system utilizes wave signals transmitted from a satellite to obtain the present location and, by referencing the present location with the maps stored in the system, provides a navigation service to a desired destination.

However, although such portable GPS devices are becoming smaller with advances in technology, they do have certain weight and size, and it is bothersome for pedestrians including tourists to carry about such a bulky device.

Furthermore, batteries as power source are necessary part of any portable GPS devices, but as their capacity is diminished, GPS becomes inoperable.

SUMMARY OF THE INVENTION

An object of the present invention is to provide a navigation system that enables to guide a pedestrian to a destination location without having to use a portable device designed for navigation only.

The object has been achieved in a navigation system comprising: a memory section for storing location information for specifying a location, and longitudinal and latitudinal data relating longitudes and latitudes to a plurality of locations; a present spot locating section for obtaining a present location by receiving location information through a terminal device, connected to a public communication circuit, that can send dual-tone multi-frequency signals, searching through the longitudinal and latitudinal data, and obtaining longitudinal and latitudinal data on the present location; a destination spot locating section for obtaining a destination location by receiving location information through the terminal device transmitted by means of dual-tone multi-frequency signals, searching through the longitudinal and latitudinal data, and obtaining longitudinal and latitudinal data on the destination location; and a location computation section for computing at least one of either a distance or a direction between the present location and the destination location, and providing a voice report of computed results to the terminal device through the public communication circuit.

The present navigation system receives location information, related to the present location, entered by a user through a telephone device by means of dual-tone multi-frequency signals, obtains the longitudinal and latitudinal data, computes the distance and direction of move from the present location to the destination location, and reports the results by voice reports. Accordingly, the user (pedestrian) is able to find out the distance and direction to the destination location without having to carry a device intended only for navigation purposes.

Also the object has been achieved in a modification of the basic system comprised by: a memory section for storing location information for specifying a location, and longitudinal and latitudinal data relating longitudes and latitudes to a plurality of locations, and transport facilities data relating longitudes and latitudes to transport facilities; a present spot locating section for obtaining a present location by receiving location information through a terminal device, connected to a public communication circuit, that can send dual-tone multi-frequency signals, searching through the longitudinal and latitudinal data, and obtaining longitudinal and latitudinal data on the present location; a destination spot locating section for obtaining a destination location by receiving location information through the terminal device transmitted by means of dual-tone multi-frequency signals, searching through the longitudinal and latitudinal data, and obtaining longitudinal and latitudinal data on the destination location; and a transport means determining section for determining an optimal transport facility according to longitudinal and latitudinal data on the present location and on the destination location, in relation to the transport facilities data, and providing a voice report of determined routing to the terminal device through the public communication circuit.

The present navigation system receives location information, related to the present location and destination location, entered by a user through a telephone device by means of dual-tone multi-frequency signals, obtains longitudes and latitudes of the present and destination locations, determines a suitable transport facility according to the information obtained, and provides a voice report of the selected transport facility to the user. Accordingly, the user pedestrian) does not need to carry a device designed solely for the purpose of navigation, and is able to find a route to the destination location by using ubiquitous public phone systems

BRIEF DESCRIPTION OF THE DRAWINGS

FIG. 9 is a flowchart showing the details of step S4 in FIG. 4.

FIG. 10 is a diagram of an example of the configuration of commercial messages.

DESCRIPTION OF THE PREFERRED EMBODIMENTS

It should be noted that the following embodiments are presented for illustrative purposes, and are not intended to restrict the invention in any manner. It should also be noted that combinations of the features explained in the embodiment may not necessarily be required in all cases.

An embodiment of the navigation system and a method of using the navigation system will be presented in the following with reference to the drawings.

In the following presentation, a person who has accessed or is trying to access the navigation system is referred to as the "user".

Figure 1:
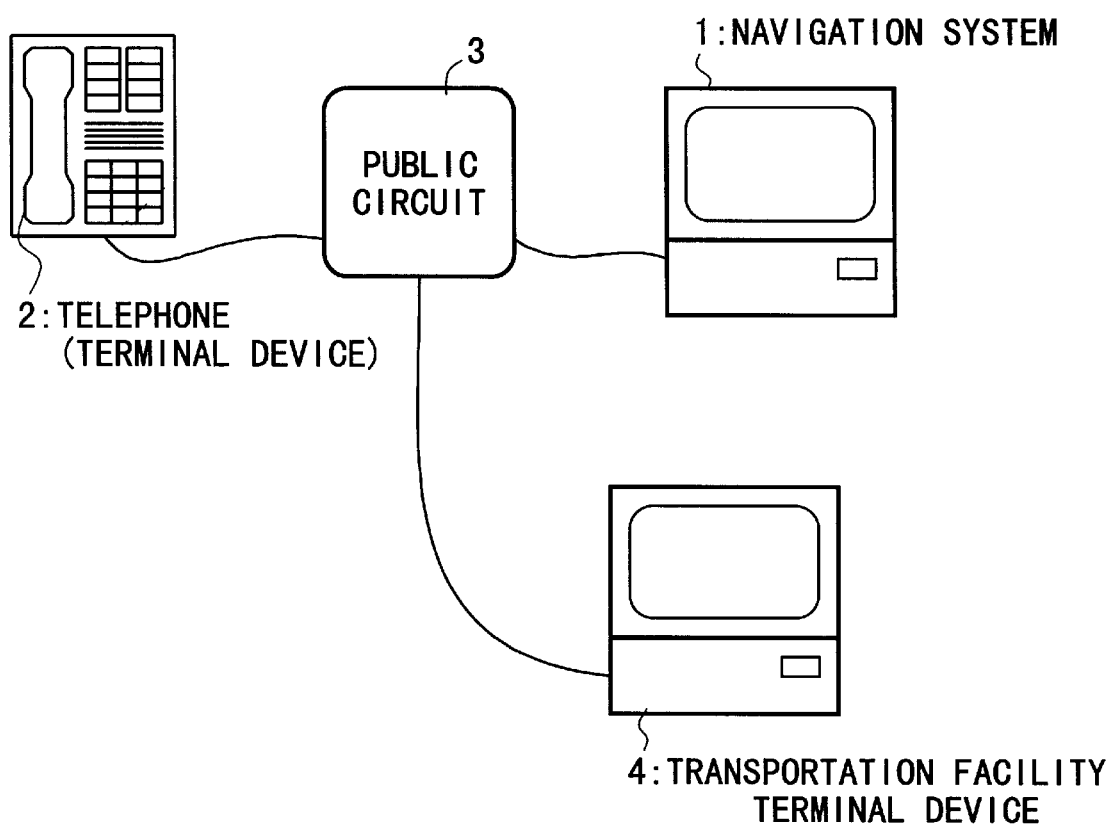
FIG. 1 is a diagram of the overall structure of the navigation system of the present invention.

FIG. 1 shows an overall configuration of the navigation system 1, which obtains information on a present location and a destination location from a telephone device (terminal device) 2 used by a pedestrian to receive voice navigational guides; and a transport facility terminal device 4 which is disposed, for example, in a transport facility such as a taxi dispatching center, for acquiring/displaying information about the present location of the user according to the navigation system 1. The navigation system 1, telephone 2, transport facility terminal device 4 are connected to a public circuit 3, and exchange information required for navigation through the public circuit 3.

Here, the telephone device is a type that is capable of transmitting DTMF signals by pressing numerals [0 ]to [9 ] or other special keys such as [* ] and [#], and is connected by wire to the public circuit 3.

Next, the detailed structure of the navigation system 1 will be explained.

Figure 2:
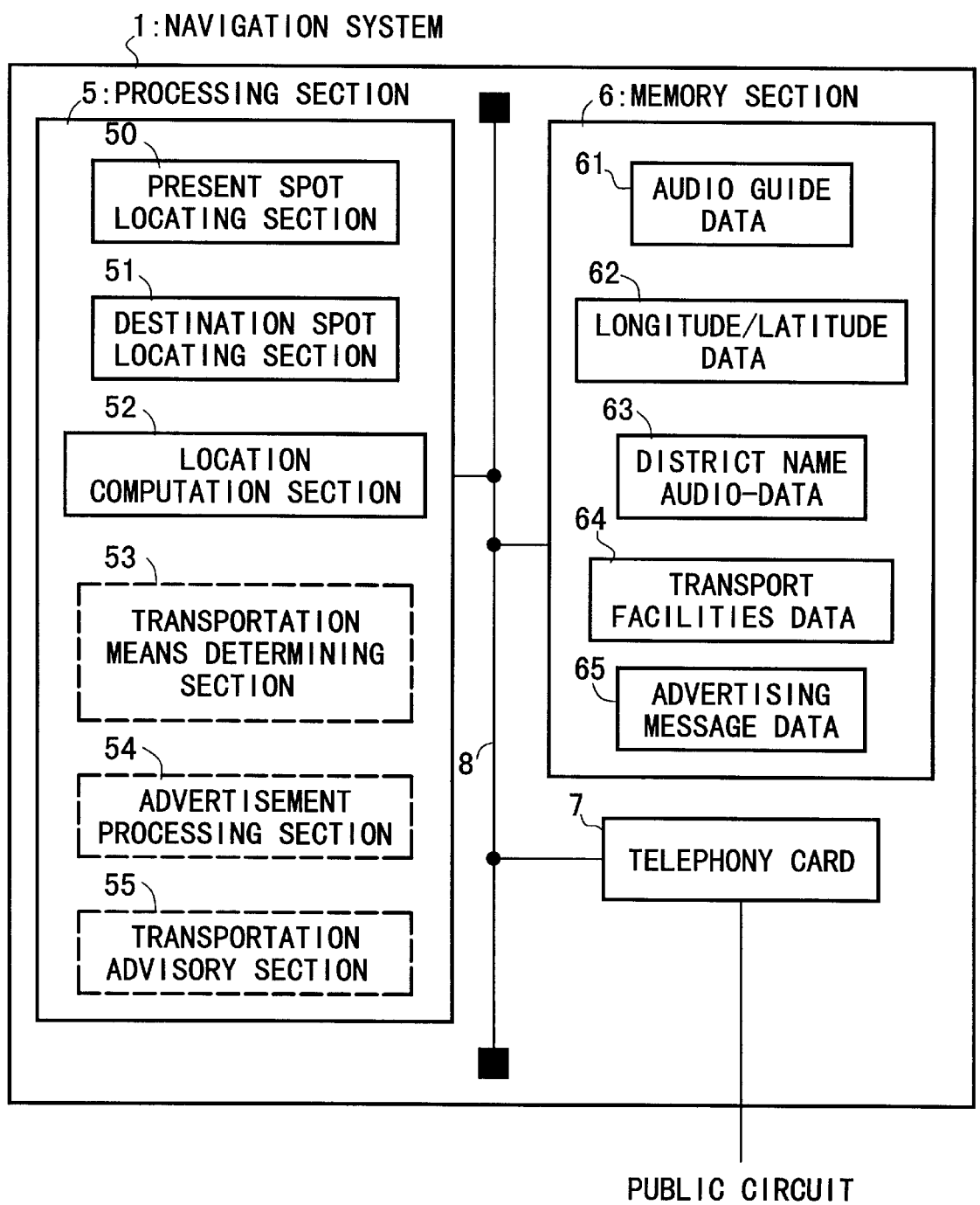
FIG. 2 is a diagram of an example of the structure of the navigation system.

FIG. 2 shows an example of the structure of the navigation system 1 comprised by: a processing section 5 for performing various processes required for navigational guidance; a memory section 6 for storing' data necessary to perform navigation service; and a telephony card 7 for connecting to a public circuit, all of which are connected by a bus system 8.

Telephony card 7 provides the following functions: to execute communication protocol with the public circuit 3; to detect DTMF signals forwarded from the telephone 2 and to identify respective keys such as [* ] or [#] and numerals between [0] to [9] to correspond to the signals; to convert signals received in a specific format, such as the wav-format used for digitized music/voice signals, to analogue signals for transmission to the public circuit 3.

Memory section 6 stores data that are used during the navigation service, such as audio guide data 61; longitude/latitude data 62; district name audio-data 63; transport facilities data 64; commercial messages data 65.

Here, audio guide data 61 is comprised by a plurality of digital files produced by digitizing voice signals necessary for providing audio-guidance in a specific format such as wav-files, in this case.

Longitude/latitude data 62 relate location information (telephone number) for specifying a location to the longitudinal and latitudinal data.

District name audio-data 63 relate a location to the voice files for announcing the location (district name), and are assumed to be in the wavformat.

Transport facilities data 64 relates longitudinal and latitudinal data to the information on the location of a train station or a taxi dispatching center.

Commercial messages data 65 are related to a plurality of voice files containing the advertising audio-messages, in the wav-format, in this case.

Details of the contents of the above data will be explained later.

The memory section 6 is comprised by non-volatile memory devices such as hard disc or opto-magnetic disc.

The processing section 5 is comprised by: a present spot locating section 50; a destination spot locating section 51; a location computation section 52; a transport means determining section 53; an advertisement processing section 54; and a transport facility advisory section 55.

Present spot locating section 50 executes the steps to: receive location information on the location of the inquiring telephone; search through the longitude/latitude data 62 using the location information as the search key; and obtain longitude/latitude information on the present location. Here, [location information] refers to information required for specifying the present location or destination location. In this embodiment, [location information] is given by a telephone number.

Destination spot locating section 51 executes the steps: to receive DTMF signals sent from the telephone indicating the destination location; search through the longitude/latitude data 62, using the location information as the search key; and obtain longitude/latitude information on the destination.

Location computation section 52 executes the steps to compute at least one of distance and direction, according to the longitudinal and latitudinal data received from the present spot locating section 50 as well as the longitudinal and latitudinal data received from the destination spot locating section 51.

Also, the location computation section 52 sends voice report of the results of computation to the inquiring telephone.

Transport means determining section 53 executes the steps to determine an optimum transportation route for reaching the destination from the present location, according to longitudinal and latitudinal data for the present location obtained from the present spot locating section 50 as well as longitudinal and latitudinal data for the destination obtained from the destination spot locating section 51, and then, using these data as search keys, search through the transport facilities data 64. Also, the transport means determining section 53 informs the user of the selected transportation route by voice, through the telephone. In this embodiment, a transport facility includes "walking", "taxi" and "train", so that the optimum facility is comprised by a combination of such means.

Advertisement processing section 54 executes the steps to transmit commercial messages stored in the advertising message storage 65 during the idle periods between processing steps, that is, when information is not being exchanged between the telephone and navigation system 1.

Transport facility advisory section 55 executes the steps to inform the user of the transport means determined by the transport means determining section 53; for example, if the facility chosen is a taxi and the user requests this service, the transport facility advisory section 55 forwards information necessary to dispatch a taxi such as the present location determined by the present spot locating section 50 and/or longitudinal and latitudinal data to the transport facility terminal device 4 disposed in the taxi dispatching center.

Here, the processing section 5 is comprised by memory devices and a central processing unit (CPU), and functions to execute application programs (not shown in the diagram) to provide various operations by computer means.

Also, it is supposed that peripheral devices such as input and display devices are connected to the present navigation system 1, but they are not indicated in the diagram. Input device includes a keyboard and a mouse and the like. Display device includes a cathode ray tube (CRT) and a liquid crystal display panel and the like.

Next, the transport facility terminal device 4 will be explained.

Figure 3:
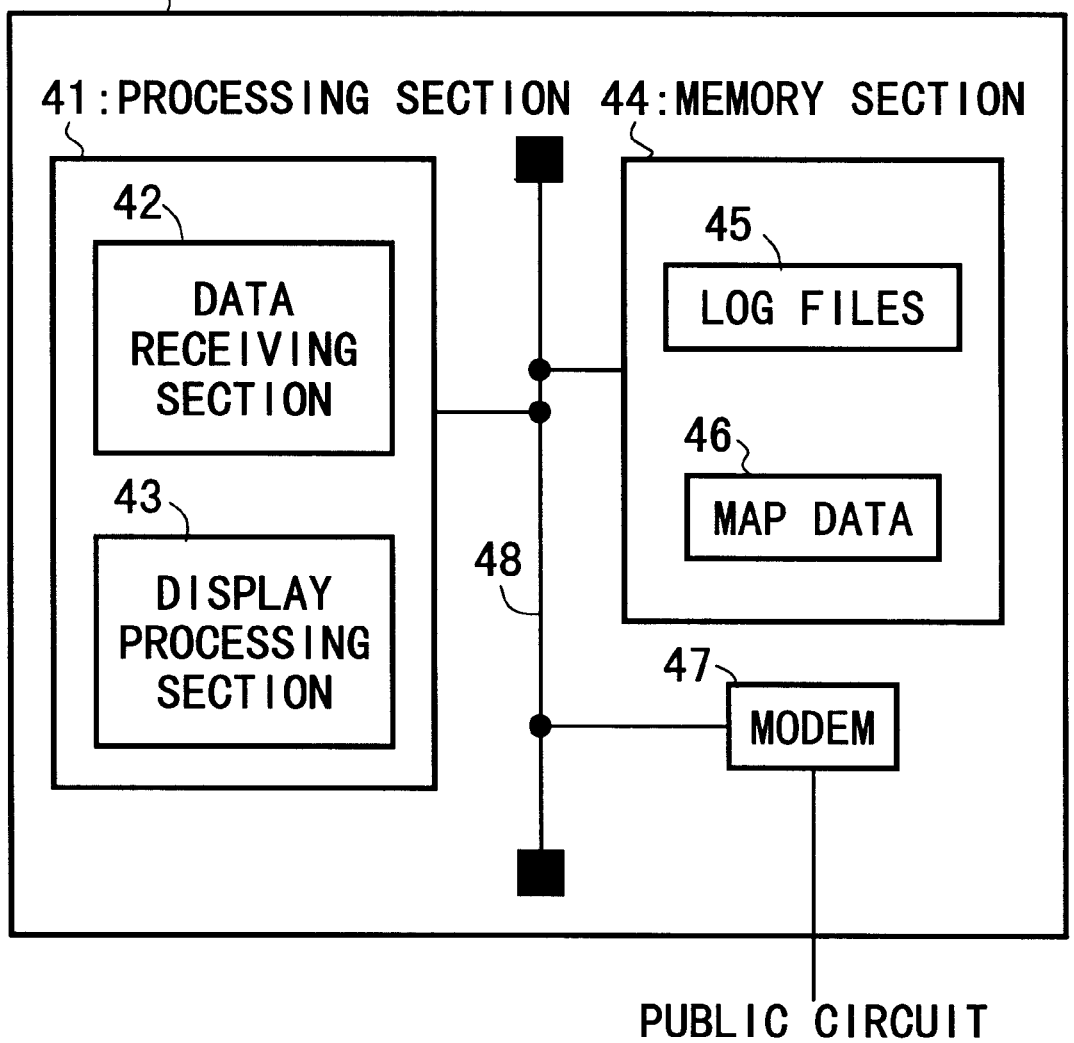
FIG. 3 is a diagram of an example of the structure of the transport facility terminal device.

FIG. 3 shows an example of the structure of the transport facility terminal device 4 comprised by: a processing section 41 for performing various processes on the information obtained from the navigation system 1; a memory section 44 for storing data necessary to process information obtained from the navigation system 1; and a modem 47 for connecting to the public circuit, all of which are connected by a bus system 48.

Memory section 44 stores a log file 45 and map data 46.

Log file 45 successively stores information sent from the navigation system 1.

Map data 46 are data to form a map image corresponding to the logitudinal and latitudinal data, and are used to display the present location of the user, who has accessed the navigation system 1, in an easy to understand manner.

Here, the memory section 44 is comprised by a non-volatile memory device such as hard disc and opto-magnetic disc.

Processing section 41 is comprised by a data receiving section 42 and a display section 43.

Here, the data receiving section 42 executes the steps to acquire the information sent by the navigation system 1.

Display processing section 43 executes the steps to search through the map data 46 using the information acquired by the data receiving section 42, and display information on the present location of the user.

Also, it is supposed that the transport facility terminal device 4 is connected to peripheral devices such as input and display devices, but they are not indicated in the diagram. Input device includes keyboard and mouse and the like. Display device includes cathode ray tube (CRT) and liquid crystal display panel and the like.

Next, the operation of the navigation system 1 will be explained. In the following presentation, the user dials the telephone number assigned to the circuit connected to the navigation system 1 using the telephone 2 shown in FIG. 1.

Figure 4:
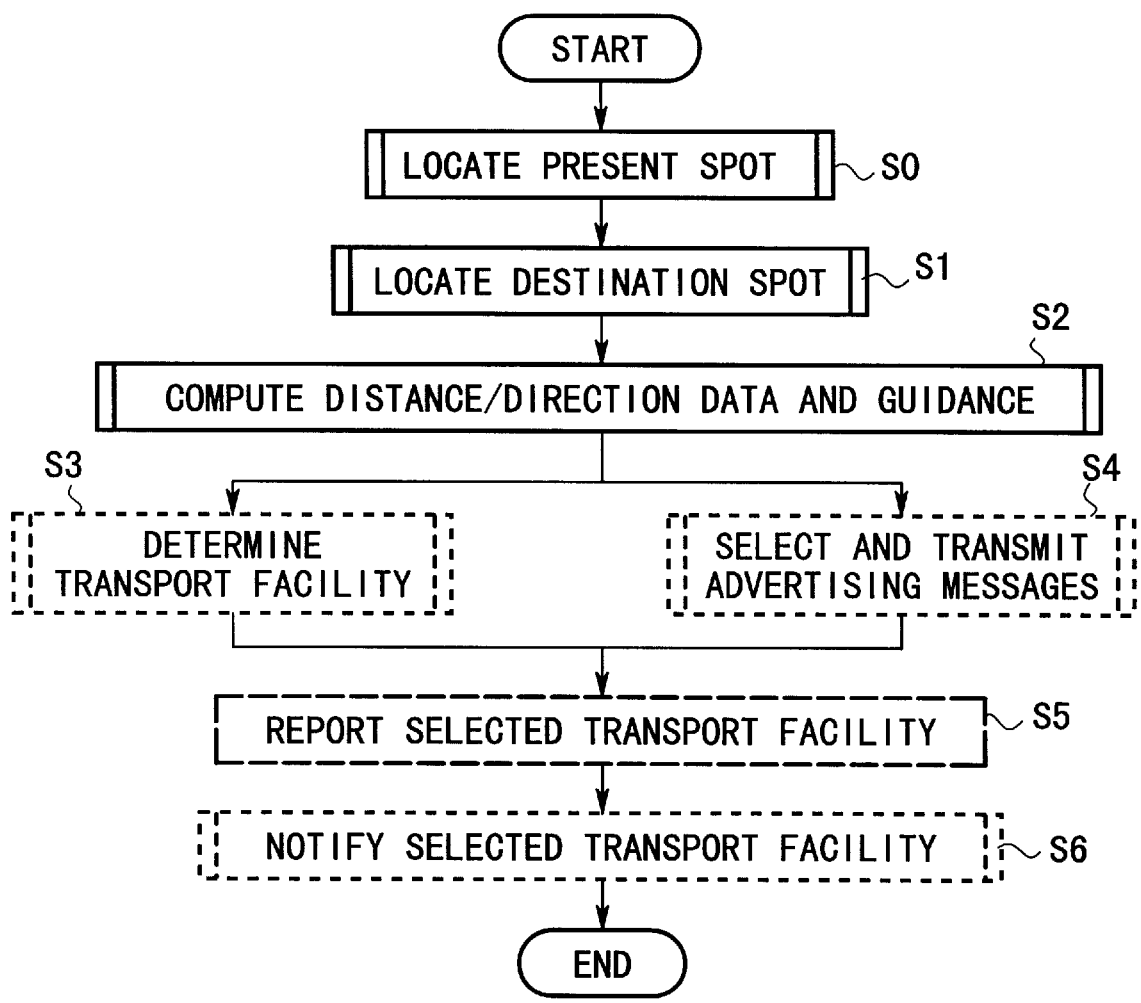
FIG. 4 is a flowchart of the operation of the navigation system.

FIG. 4 shows a flowchart for the operation of the navigation system 1. The operation shown in FIG. 4 is commenced when the telephony card 7 completes a circuit connection with the telephone 2, and after the processing section 5 is notified of a completion of connection by the telephony card 7.

First, the present spot locating section 50 executes the steps to receive location information from the telephone 2 transmitting DTMF signals. The present spot locating section 50 searches through the longitude/latitude data 62 using the location information as the search key to obtain the longitudinal and latitudinal data of the present location of the user (step S0).

Figures 5, 6:
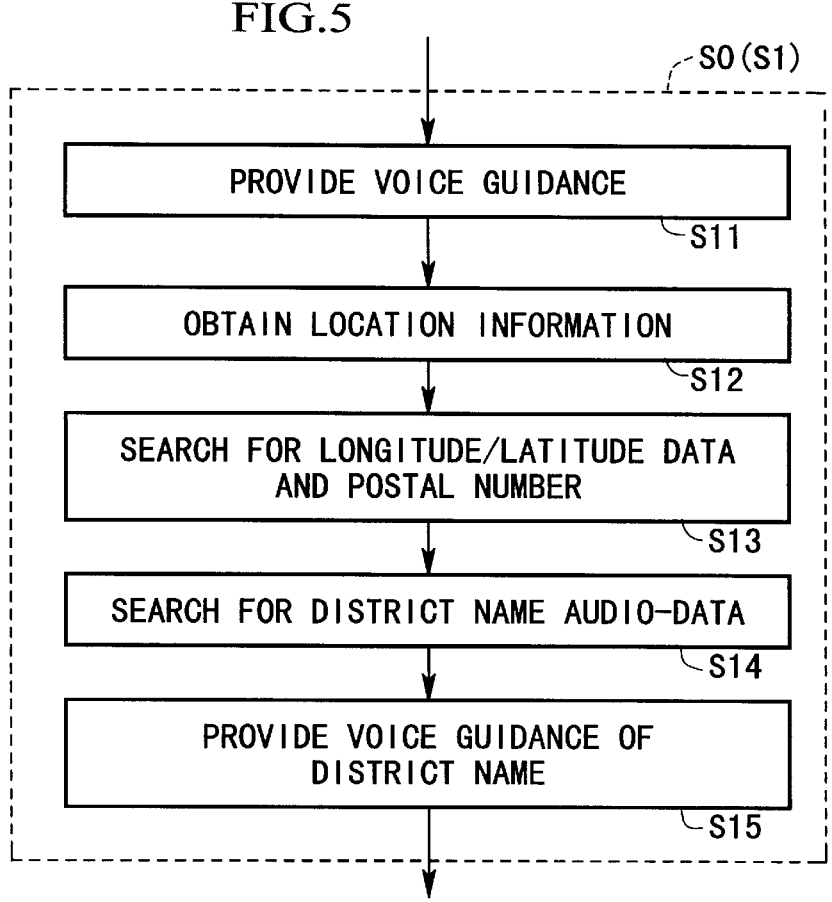
FIG. 5 is a flowchart showing the details of step S0 in FIG. 4.
FIG. 6 is a diagram of an example of the configuration of longitudinal and latitudinal data.

FIG. 5 shows the details of step S0 for determining the present location.

First, the present spot locating section 50 executes the steps to provide a voice guidance to the user so that the user can enter information regarding the present location of the user (step S11). That is, the present spot locating section 50 obtains a voice file related to audio guidance data necessary for inputting the user's present location information from the data stored in the audio guide data 61. Then, the present spot locating section 50 outputs the digital data, contained in the voice file obtained, to the telephony card 7. The telephony card 7 converts entered analogue data to digital data, and outputs the results as audio-data to the telephone 2 through the public circuit 3, thereby enabling the user to hear the voice guidance message on the telephone 2 so as to obtain information regarding whereabouts of the present location. An example of such voice message may be "to obtain your present location, please enter the telephone number of the public telephone you are using, and press the (#) key when finished ".

Such a process of converting the audio-data stored in the voice file by way of the telephony card 7 is referred to as a [guidance process], in this system.

Upon hearing the voice guidance, the user inputs the relevant telephone number using keys on the telephone 2 and presses (#) key as the last step. This step prompts the telephone 2 to send the DTMF signals corresponding to the pressed keys.

Next, upon detecting that DTMF signals are entered, the telephony card 7 determines numerals and the signs corresponding to the DTMF signals according to the associated frequency components, and notifies the processing section 5.

When notified by the telephony card 7, the present spot locating section 50 obtains the telephone number and the number key to indicate the end of the task entered from the inquiring telephone 2 by (step S12).

Then, the present spot locating section 50 searches the longitude/latitude data 62, using the telephone number as the search key, and obtains longitudinal and latitudinal data and a postal number corresponding to the location (address) of the inquiring telephone having the telephone number transmitted (step S13). FIG. 6 shows an example of the table of longitude/latitude data 62. The longitude/latitude data 62 are arranged in the table so that a postal number, assigned to the location of the telephone 2 and its longitudinal and latitudinal data, corresponds to each telephone number. The present spot locating section 50 obtains the postal number, longitude and latitude by searching through the longitude/latitude data 62 using the telephone number as the search key. The precision of the longitudinal and latitudinal data are within 0.1 second, which is the same as the precision associated with the GPS. Accordingly, it is possible to specify a location with high precision. Here, 0.1 second corresponds to about 3.1 m in the latitude direction while near the 35 degree latitude, 0.1 second corresponds to about 2.5 m in the longitudinal direction.

Next, the present spot locating section 50 searches through the district name audio-data 63 using the postal number obtained in step S13 as the search key, and finds a voice file for announcing the location name corresponding to the postal number (step S14). In the district name audio-data 63, each postal number corresponds with the file name containing the voice file for use in announcing the location name associated with the postal number. It is supposed that the voice file is in the wav-format.

The present spot locating section 50 provides a voice guidance using the voice file specified in step S14 (step S15). An example of such a voice guidance may be:

"present location is xx number, xx street, is this correct?".
By following such a guidance procedure, the user can confirm whether there has been any error in inputting the location information on the present location.

Accordingly, the present spot locating section 50 obtains location information on the present location using the DTMF signals transmitted by the telephone 2, searching through the longitude/latitude data 62 using the location information as the search key to obtain longitudinal and latitudinal data for the present location of the user. Here, the location information on the present location, postal numbers, longitudinal and latitudinal data are stored in RAM in the processing section 5.

Next, the destination spot locating section 51 obtains location information on the destination location sent from the telephone 2 using the DTMF signals. The destination spot locating section 51 searches through the longitude/latitude data 62 using the destination information as the search key to obtain longitudinal and latitudinal data for the destination.(FIG. 4, step S1). In this case, the details of the steps taken by the destination spot locating section 51 are roughly the same as those taken by the present spot locating section 50. But, the voice guidance in step S11 in FIG. 5 announces a message such as:

"to enter your destination, please enter the telephone number of the destination location, and press the (#) key when finished".

Here, location information such as destination location information, postal numbers, longitudinal and latitudinal data are stored in RAM in the processing section 5.

Next, the location computation section 52 executes the steps to compute the linear distance and direction between the present location and the destination according to the longitudinal and latitudinal data obtained in the present spot locating section 50 and the longitudinal and latitudinal data obtained in the destination spot locating section 51. Also, the location computation section 52 notifies by voice the results of computation to the telephone 2 (FIG. 4, step S2).

Figure 7:
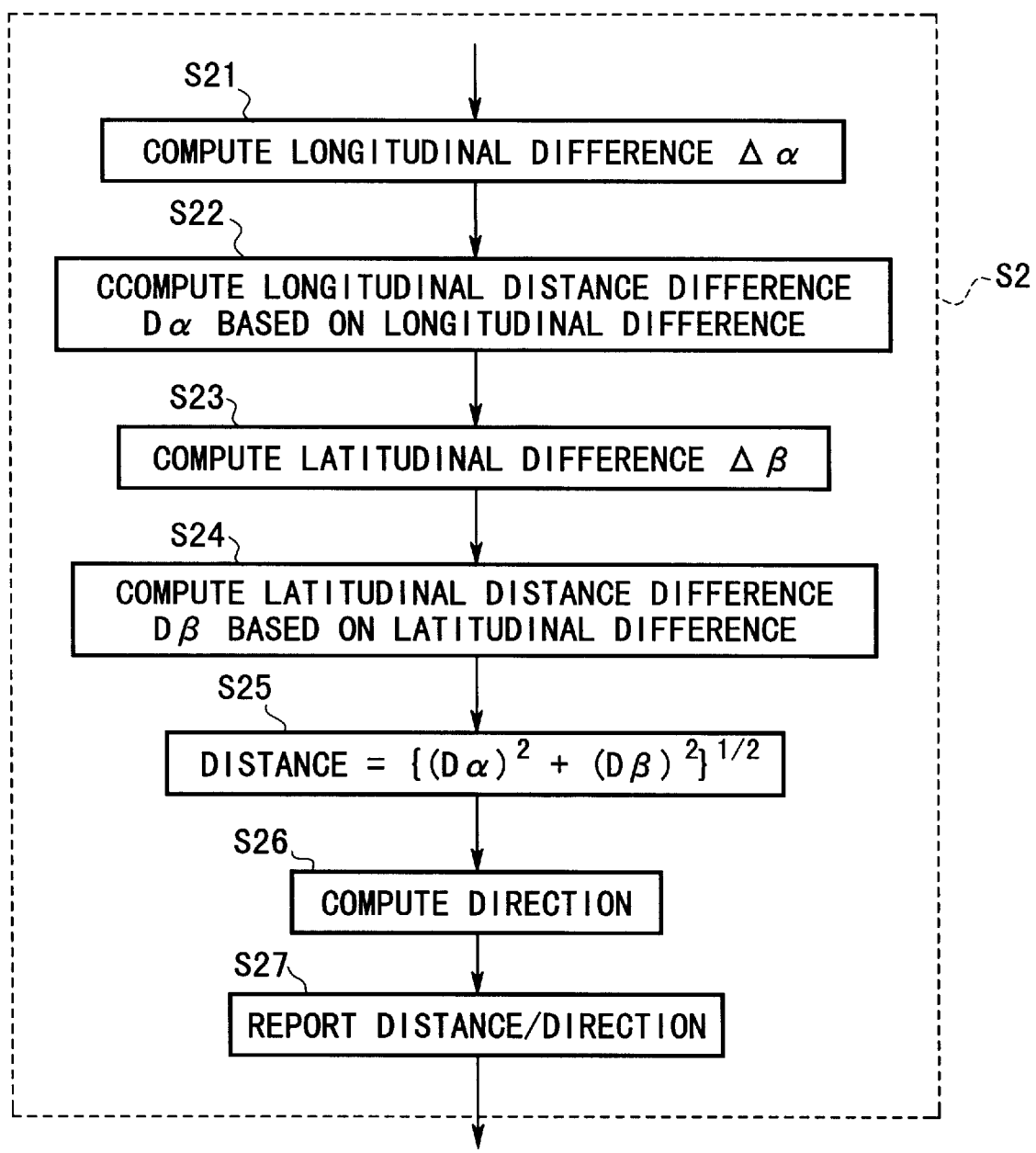
FIG. 7 is a flowchart showing the details of step S2 in FIG. 4.

FIG. 7 shows the details of this process, and will be referred to in explaining the steps taken in step S2.

First, the location computation section 52 computes a longitudinal distance Dα based on the longitudinal difference Δα obtained in step S21 (step S22).

Similarly, the location computation section 52 computes a latitude distance Dβ based on the latitudinal difference Δβ (steps S23, 24).

Next, the location computation section 52 computes the linear distance between the present location and the destination location according to the longitudinal distance Dα and the latitudinal distance Dβ (step S25).

Also, the location computation section 52 computes the direction to the destination according to the vectors (Dα, Dβ) determined by the longitudinal distance Dα and the latitudinal distance Dβ (step S26). In this case, because an approximate direction is sufficient for the direction guidance, the location computation section 52 chooses one of directions separated by 45 degrees, i.e., [north], [north west], [west], [south west], [south], [south east], [east], or [north east].

Next, the location computation section 52 provides a voice report of the results of computation in steps S25, 26 to the telephone 2 (step S26). That is, the location computation section 52 notifies by voice according to a guidance process based on the computed results and voice file stored in the audio guide data 61. An example of the voice message may be:

"the distance to the destination is xx meters, and the direction is xx".

Accordingly, the location computation section 52 notifies the linear distance and the direction between the present location and destination location. The computed results are stored in RAM in the processing section 5.

Next, the transport means determining section 53 executes the steps to determine an optimum route from the present location to the destination location, by searching through the transport facilities data 64 using the search keys, longitudinal and latitudinal data obtained in the present spot locating section 50, or longitudinal and latitudinal data obtained in the destination spot locating section 51 or computation results obtain in the location computation section 52 (FIG. 4, step S3).

Figure 8:
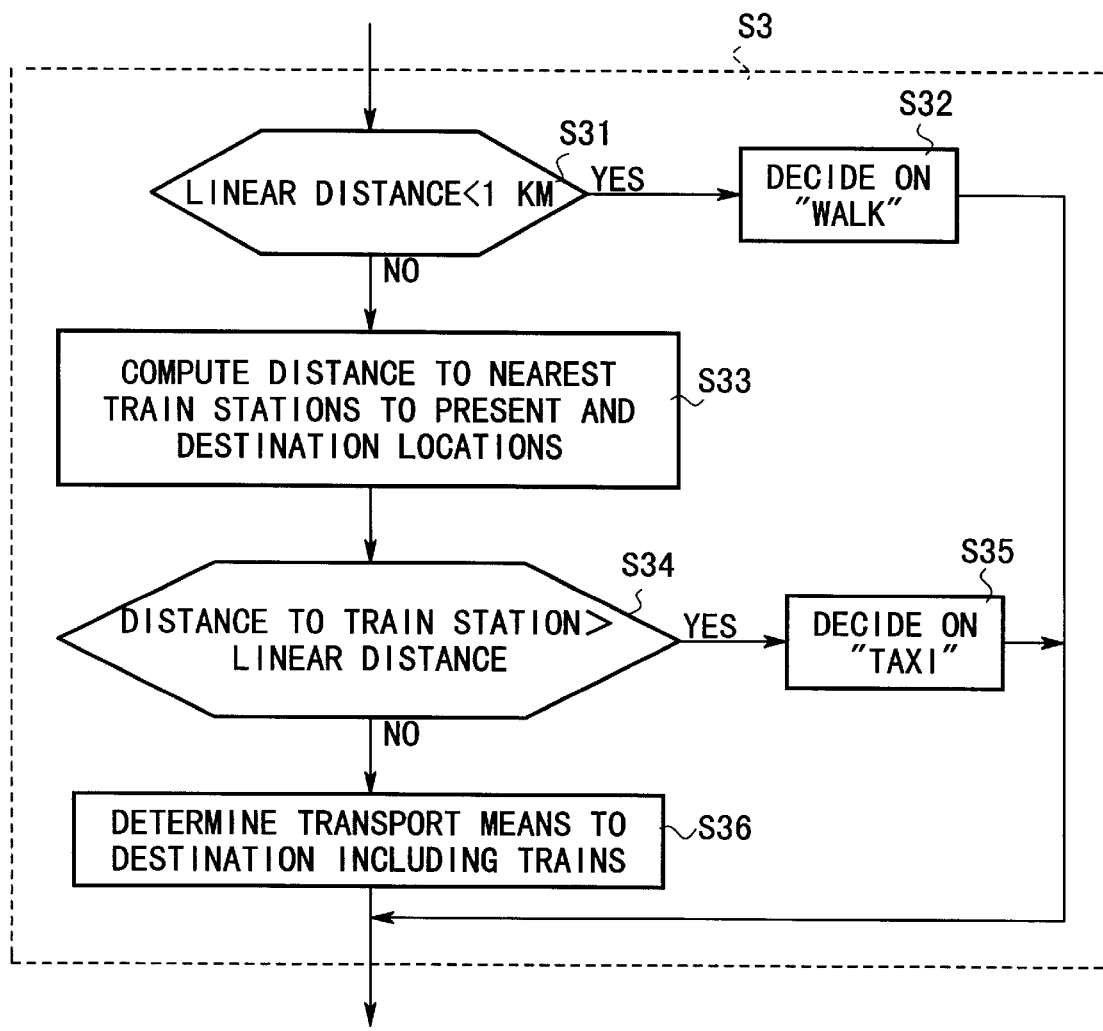
FIG. 8 is a flowchart showing the details of step S3 in FIG. 4.

FIG. 8 shows the details of this processing, and will be referred to in explaining the processing details in step S3.

First, the transport means determining section 53 determines whether the move from the present location to the destination location can be made by walking (step S31). An example of such a process of determining is, if the distance computed by the location computation section 52 is less than 1 km, for example, it decides that walking is possible. If move by walking is deemed possible, the transport means determining section 53 decides that the optimum facility is walking (step S32), and completes the step.

If, in step S31, walking is deemed to be unsuitable, the transport means determining section 53, performs the following computations, using the longitudinal and latitudinal data of the present location and the destination location as well as the transport facilities data 64: (1) searches longitudinal and latitudinal data of a local train station nearest to the present location and the linear distance to the local train station; and (2) searches longitudinal and latitudinal data of a destination train station nearest to the destination location and linear distance to the destination train station (step S33). In this case, the transport facilities data 64 include longitudinal and latitudinal data on all the relevant train stations.

Next, the transport means determining section 53 examines whether a taxi is a suitable means for transport from the present location to the destination location (step S34). An example of such an examination process is described in the following. Designating the linear distance between the present location and the destination location computed in the location computation section 52 by [A], and designating the linear distance between the present location and the nearest local train station obtained in step S33 by [B], and designating the linear distance between the destination location and the nearest destination train station by [C], if B+C>>A>2 km then, move by taxi only is judged to be an appropriate means of transport. If move by taxi only is deemed appropriate, the transport means determining section 53 decides that the optimum means of transport is taxi, and completes step S3.

On the other hand, if a move by taxi only is deemed inappropriate, the transport means determining section 53 examines a suitable combination of [walking], [taxi] and [train] method of move (step S36). Here, information such as local station, destination station, linear distances from the present location to the local station and destination station to the destination location, and determines an optimum combination of means of transport, including trains. For example, if the linear distances between the present location and the destination location as well as to and from their respective stations are less than 1 km, move between these points are made by walking, otherwise, a taxi is chosen. Also, the transport facilities data 64 include train routing information and train transfer times, and the transport means determining section 53 consults such databases and determines an optimum route from the present location to the destination location.

By following the steps described above, the transport means determining section 53 determines optimum transport facilities from the present location to the destination location. Also, information relating to the transport facilities chosen are stored in RAM in the processing section 5.

In the meantime, while the transport means determining section 53 is determining the optimum transport facilities, the advertisement processing section 54 transmits advertising messages stored in the advertising messages data 65 to the telephone 2 (FIG. 4, step S4).

FIG. 10 shows an example of the table of advertising message data 65 to be searched by the advertisement processing section 54. As shown in this table, the commercial messages data 65 are contained in a voice file, in this case an advertising message file name 91, which is related to rank information 92, district information 93, timeband information 94. Here, [commercial messages file] is assumed to be in the wav-format.

Here, rank information 92 is information related to the priority order of the messages to be announced, and contains ranking which is indicated by [S], [1], [2], [3] . . . , for example. Ranking order [S] indicates the highest priority that the message is to be announced without restriction. For example, information such as traffic tie-ups or natural disasters is given this ranking [S] so that the message can be announced in any district and timebands.

District information 93 is information related to the district to be targeted for advertising. It becomes possible to direct a message customized to a particular district by providing district information 93. In this case, district information 93 is represented by one or a plurality of postal numbers.

Timeband information 94 is information related to the timebands for announcing the message. It becomes possible to advertise for select businesses that are active in certain timebands by providing timeband information. In this case, timebands are as follows:

α . . . 7:00~11:00
β . . . 11:00~16:00
γ . . . 16:00~22:00
δ . . . 22:00~7:00 so that one or more timebands are included in timeband information 94.

FIG. 9 shows the details of processing steps performed by the advertisement processing section 54 in step S4.

First, the advertisement processing section 54 refers to the rank information 92 in the advertising message data 65, and examines whether there are any priority messages to be announced (step S41). In practice, the advertisement processing section 54 checks whether there are any commercial messages with an [S] ranking.

If there is a priority message, the advertisement processing section 54 acquires a file name of the advertising message and performs a guidance process for announcing the advertising message by using the wav-file (step S42).

If there is a priority message or when the step of announcing the priority message is completed, the advertisement processing section 54 searches through the district information 93, using as search keys information related to the present location obtained in step S0 and information related to the destination location obtained in step S1, and extracts relevant data (step S43). In practice, the advertisement processing section 54 extracts data (records) containing the postal numbers of the present location or destination location as district information 93.

Next, the advertisement processing section 54 executes the steps to search through the records obtained in step S43, using the current time as the search key, and extract relevant records (step S44). In practice, the advertisement processing section 54 narrows the selection by selecting those records having the current timeband in the timeband information 94.

Then, the advertisement processing section 54 sequentially announces messages in the ranking order from the narrowed record in step S44, in other words, performs a guidance process (step S45).

Here, processing in step S45 stops when several specific messages have been announced or when the process of determining a transport facility by the transport means determining section 53 (FIG. 4, step S3) is completed.

Accordingly, the advertisement processing section 54 executes the steps for announcing commercial messages customized to individual districts and timebands.

Next, the transport means determining section 53 executes the steps to report the transport facility selected in step S3 to the telephone 2 (FIG. 4, step S5). That is, the transport means determining section 53 notifies the telephone 2 by executing a guidance process using the transport means selected in step S3 and the voice file stored in the audio guide data 61. When the optimum transport means is determined to be walking, report may be announced as follows:

"the destination location can be reached from the present location by walking, the distance is xx meters and it is in the xx direction".

Also, if the optimum transport means is determined to be a taxi, the report may be announced as follows:

"taxi is suitable for reaching the destination location from the present location, the distance is xx meters, and it is in the xx direction".

Next, the transport facility advisory section 55 executes the steps to dispatch a taxi if the user requests such a service, and transmit information necessary for sending a taxi to the transport facility terminal device 4 (FIG. 4, step S6).

Figure 11:
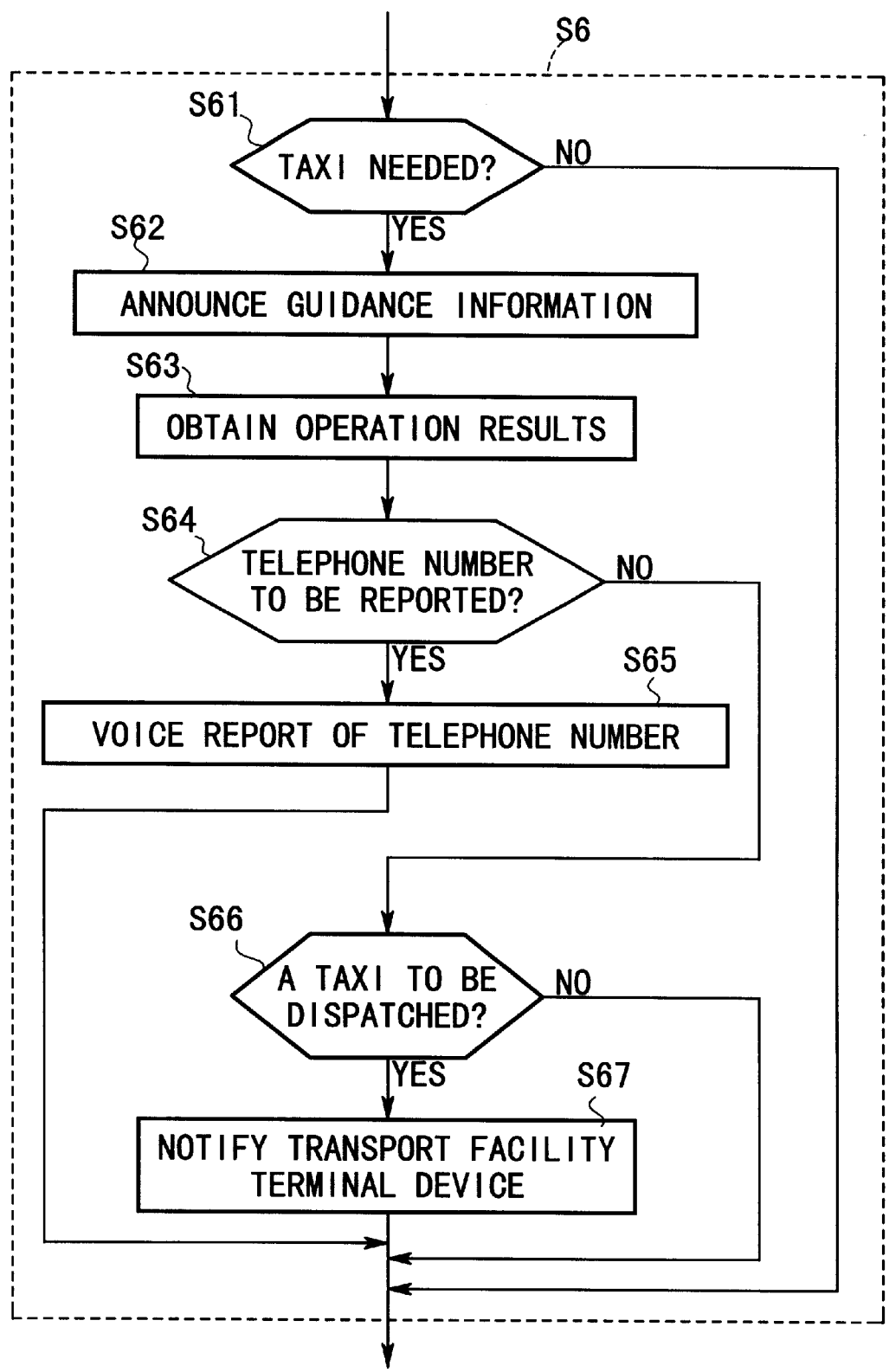
FIG. 11 is a flowchart showing the details of step S6 in FIG. 4.

FIG. 11 shows the details of the process and will be referred to in explaining the steps taken in step 6.

First, the transport facility advisory section 55 checks whether a taxi as a transport means has been chosen in step S3 by the transport means determining section 53 (step S61). If a taxi has been decided as the transport means for moving from the present location to the destination location, or from the present location to the nearest train station, then the transport facility advisory section 55 judges that a taxi has been chosen as the means of transport. Here, if it judges that a taxi has not been chosen, the transport facility advisory section 55 finishes the process.

If it is judged that a taxi has been chosen, the transport facility advisory section 55 executes a guidance process for dispatching a taxi using a voice file stored in the audio guide data 61 (step S62). The guidance provided in this case may be announced as follows:

"a taxi will be dispatched to the destination location (or a nearest train station), so, if a taxi is desired please press 1 and #, if the nearest taxi dispatching center is desired, please press 2 and #, and if it is wished to terminate navigation service, please press 0 and #".

Following such guidance instructions, when the user operates the buttons on the telephone 2 accordingly, the telephone 2 transmits DTMF signals. The DTMF signals are detected by the telephony card 7, and a detected result, "1,#", "2,#" or "0 #", will be transmitted to the processing section 5.

When a notice from the telephony card 7 is received by the transport facility advisory section 55, an operation result indicating the user's selection is obtained by the transport facility advisory section 55 (step S63).

Next, by referencing the operation results obtained in step S63, the transport facility advisory section 55 judges whether or not the content of the operation results is a notice of a telephone number of the nearest taxi company (step S64). That is, when the operation result obtained in step S63 is "2,#, then the transport facility advisory section 55 judges that the content of the operation result is a notification of the telephone number of the nearest taxi company.

When it is judged that the content of the operation result is a telephone number of the nearest taxi company, the transport facility advisory section 55 refers to the transport facilities data 64 to find the telephone number of the nearest taxi dispatching center, and reports the telephone number by voice (step S65). In this case, the transport facilities data 64 includes relevant information such as the longitudinal and latitudinal data of the dispatching center, its telephone number, and the company name and the like. Then, the transport facility advisory section 55 searches through the transport facilities data 64 using the longitudinal and latitudinal data of the present location as the search key, and obtains information related to the telephone number of the taxi dispatching center nearest to the present location and company name, and performs guidance processing using the voice file stored in the audio guide data 61. The voice message may be announced as follows:

"the telephone number of the nearest taxi company is xx. The name of the taxi company is xx".

When processing of step S65 is finished, the transport facility advisory section 55 has completed processing steps in S6.

If, in step S64, the transport facility advisory section 55 judges that the content of the operation is not the notification of telephone number of the nearest taxi company, it judges whether or not the content of the operation is dispatching of a taxi, by referencing the operation result obtained in step S63 (step S66). That is, if the operation result obtained in step S63 is "1, #", the transport facility advisory section 55 judges that the content of the operation is dispatching, of a taxi.

If the transport facility advisory section 55 judges that the content of the operation is dispatching of a taxi, it searches for the telephone number to connect to the transport facility terminal device 4 disposed in the taxi dispatching center by referencing the transport facilities data 64. Then, the transport facility advisory section 55 transmits information necessary for dispatching a taxi to the transport facility terminal device 4 (step S67).

In this case, the transport facilities data 64 includes relevant information such as the longitudinal and latitudinal data of the dispatching center, the telephone number assigned to the terminal device 4, and the company name and the like. Then, the transport facility advisory section 55 searches through the transport facilities data 64 using longitudinal and latitudinal data of the present location as the search key, and obtains information related to the telephone number of the taxi dispatching center nearest to the present location and company name.

Then, the transport facility advisory section 55 accesses the transport facility terminal device 4 using a circuit different than the circuit connected to the user, and transmits information necessary for dispatching a taxi. Here, [information necessary for dispatching a taxi] is the present location of the user at least. Therefore, the transport facility advisory section 55 transmits at least one of either the telephone number of the present location or longitudinal and latitudinal data obtained by the present spot locating section 50. Further, the transport facility advisory section 55 may also transmit other information such as the postal number or district name corresponding to the postal number and information related to the destination location.

Figure 12:
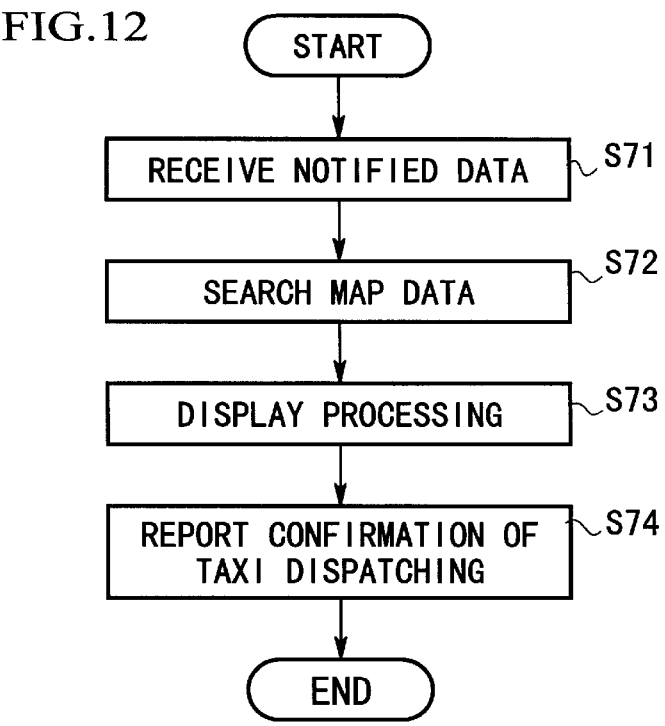
FIG. 12 is a flowchart showing the operation of the terminal device at a transport facility.

The operation of the transport facility terminal device 4 receiving data from the navigation system 1 is shown in FIG. 12. Here, the operation is started when the modem 47 completes the connection to the navigation system 1 and a report of completion is received by the processing section 41.

First, the data receiving section 42 obtains information sent by the navigation system 1 through the modem 47 (step S71). In this case, information sent by the navigation system 1 is related to longitudinal and latitudinal data of the present location, district name of the present location and district name of the destination location.

Next, the display processing section 43 obtains street information of the neighborhood of the present location by searching in the map data 46 (step S72). In this case, the map data 46 relates longitudinal and latitudinal data to the map image.

Figure 13:
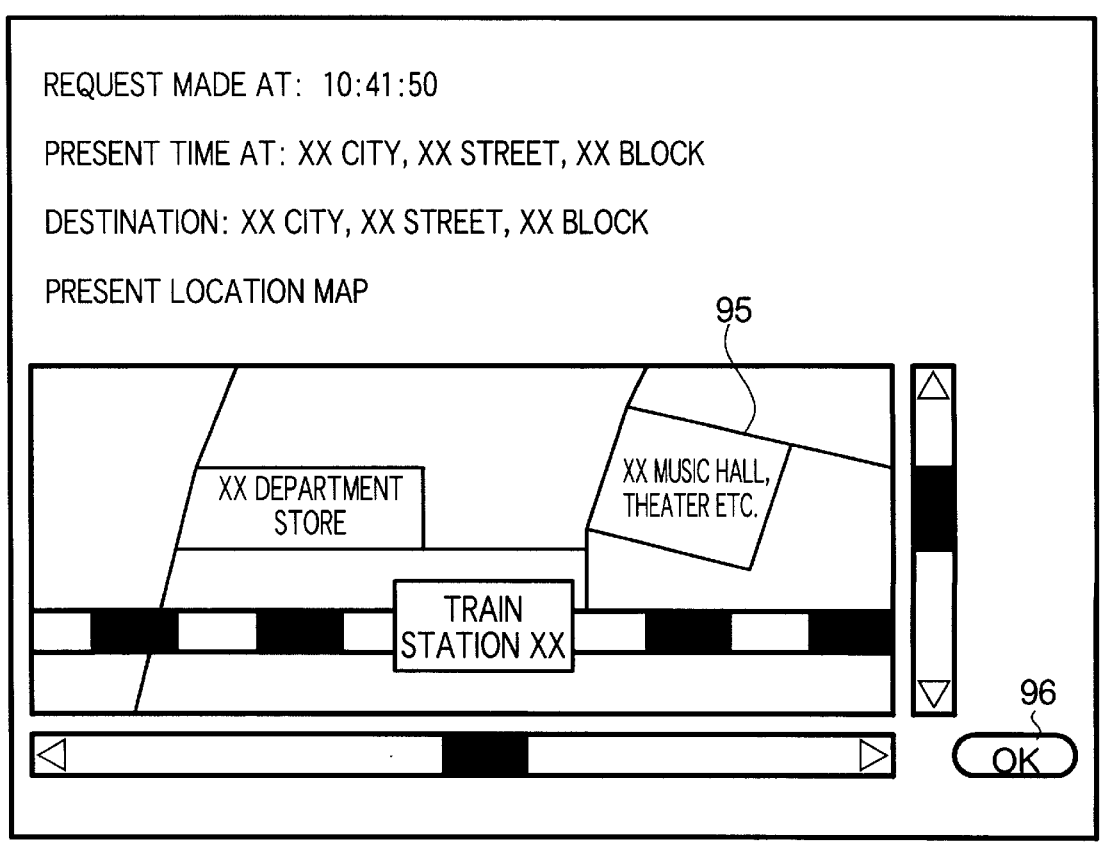
FIG. 13 is a diagram of an example of the display on the terminal device at the transport facility.

Then, the display processing section 43 displays an image such as the one shown in FIG. 13 (step S73). In FIG. 13, the present location of the user is shown by a reference numeral 95.

The operator working on the display processing section 43 dispatches a taxi according to the display content, and clicks [OK] shown in FIG. 13 to indicate the completion of taxi dispatching process, then, the display processing section 43 reports to the navigation system that the step of taxi dispatching has been completed (step S74). The display processing section 43 outputs information obtained in step S71 to the log file 45 and commands the modem to disconnect the line, to complete the process.

Upon receiving a report from the transport facility terminal device 4 that the taxi dispatching process has been completed, the transport facility advisory section 55 executes a guidance process to announce that a taxi has been dispatched using the voice file stored in the audio guide data 61. The report may be announced as follows:

"a taxi from xx company has been dispatched".

As described above, the transport facility advisory section 55 thus executes the steps to dispatch a taxi according to a request by the user.

In this embodiment, the present spot locating section 50 and the destination spot locating section 51 acquire telephone number as the location information. This approach is desirable from the viewpoints of specifying the present location and destination location more precisely than otherwise, but the method is not limited to this approach. For example, location information may be represented by a postal number. In such a case, the longitude/latitude data 62 may include a specific location in a district specified by a postal number, for example, a central location in the district.

Also, in this embodiment, the present spot locating section 50 acquires location information according to the user's instructions (FIG. 5, steps S11, 12). On the other hand, if the telephony card 7 has a capability to acquire a telephone number of a destination contact by means of a communication service, the steps S11, 12 may be eliminated so that the present spot locating section 50 receives the information related to the present location through the telephony card 7.

Also, in this embodiment, the location computation section 52 computed both a linear distance and a direction between the present location and the destination location, but these are not the only method. For example, the location computation section 52 may compute either a distance or a direction to be reported.

Also, in this embodiment, if the transport facilities data 64 included street data related to longitudinal and latitudinal data, and furthermore, the location computation section 52 included a capability to provide routing according to the street data on the basis of the longitudinal and latitudinal data, then, the location computation section 52 may report a routing distance according to the routing information instead of a linear distance between the present location and the destination location.

Also, in this embodiment, the location computation section 52 computes/reports linear distance and direction between the present location and the destination location, and the transport means determining section 53 selects an optimal transport facility for moving from the present location to the destination location. In other words, the navigation system 1 first reports linear distance and direction from the present location to the destination direction, then reports an optimal transport facility, resulting in reporting twice. The system may be arranged so that the transport means determining section 53 has all the functions excepting the reporting means shown in FIG. 7, step S27, so that the linear distance and direction information is contained in a notice of optimum transport facility to result in one reporting.

Also, in this embodiment, the transport facilities data 64 may contain
(1) train schedules and ticket prices, and
(2) taxi service charges so that, if taxi or train are selected as optimum transport means, the transport means determining section 53 may report the time as well as the cost required to move from the present location to the destination location.

Also, in this embodiment, the transport means determining section 53 selected one or more transport means from a group of means "walking", "taxi", and "train", but the method is not limited to this approach. If the transport facilities data 64 includes information other than those above, they may be included in the consideration.

Also, in this embodiment, the advertisement processing section 54 announced commercial messages while the transport means determining section 53 is undertaking the process of determining a transport facility, but the method is not limited to this approach. It may be arranged so that the advertisement processing section 54 announces commercial messages during the idle times between the user and the navigation center 1 or at other specified times.

Also, in this embodiment, commercial messages were related to rank information 92 indicating the priority order of messages, district information 93 indicating the district to be targeted and timeband information 94 indicating the timeband in a day for announcing the messages. Customized messages need not be limited to such methods. For example, reasonably effective targeting of markets may be achieved by selecting one or two of rank information 92, district information 93 and timeband information 94. Commercial messages may also be announced in a given order without being restrained by the rank information 92, district information 93 and timeband information 94.

Also, in this embodiment, the transport facility terminal device 4 was disposed at the taxi dispatching center and the navigation system 1 transmitted information necessary for dispatching a taxi to the terminal device 4, when the user request such a service. But the method is not limited to such an approach. If the transport facility terminal device 4 is disposed in another transport facility, the navigation system 1 may send information on a transport facility to another facility if another facility is relevant to means for transporting the user.

Also, in this embodiment, the user accessed the navigation system 1 through a public telephone connected by wire to a public circuit 3. This method is desirable because of the ease of identifying the present location from the telephone number, but the method is not limited to such an approach. For example, portable phone terminal or personal handy system (PHS) terminal device can also access the navigation system 1. In such a case, the user of portable phones and PHS terminal device may enter the telephone number of the nearest wired public telephone. Or, the navigation system 1 may acquire the location of the common services (CS) station operating with the portable phones or PHS.

Also, in this embodiment, the navigation system 1 operates in conjunction with a telephony card 7 provided with a capability to generate DTMF signals. But the method is not limited to such an approach. The navigation system 1 may be provided with a modem to operate with signals in audio frequency bands that are outside of the voice communication protocol to be processed in the processing section 5. In such a case, the processing section 5 is further provided with a signal discrimination section to perform DTMF signal detection by softwares by detecting and discriminating DTMF signals from the results of spectrum analysis of spectra obtained by frequency conversion of DTMF signals.

Also, in this embodiment, voice files are assumed to be in the wav-format, but the method is not limited to such an approach. Other file formats are equally applicable.

Also, the navigation system 1 may be operated by recording computer-readable application programs in a recording medium, and by executing the processing steps of the processing section shown in FIG. 2 by a computer system. Also, the processing section 41 may be operated by recording computer-readable application programs in a recording medium, and by executing processing of information sent from the navigation system 1 by a computer system. Here, computer system, in this context, includes any operating systems (OS) and peripheral hardwares. Computer readable recording media include portable media such as floppy disks, opto-magnetic disks, ROM, CD-ROM, as well as memory devices such as hard disks housed in computer systems. Further, computer readable recording media include short-term dynamic memories (transmission media inclusive of wave signals) used in transmitting applications through such network means as Internet or telephone circuits, as well as other short-term memories such as volatile memories used in servers and client computer systems.

Application program may perform a part of the described functions, or may be operated in conjunction with pre-recorded programs stored in computer systems, that is, the so-called differential files (difference programs).

The embodiments of the present invention have been explained with reference to the drawings, but the specific designs of the navigation system are not limited to those disclosed in texts and drawings. Other modifications may be made within the scope of the principle of voice navigation demonstrated in the present invention.

As explained above, the navigation system, methods therefor and computer program products containing the processing methodology provide the following features.

The present navigation system provides transmission of voice reports for guiding the user to move from a present location to a destination location through ubiquitous public telephones by receiving location information for the present location and the destination location transmitted through a public digital phone based on the DTMF signals, obtaining the longitudinal and latitudinal data, and computing the distance and direction of move from the present location to the destination location, and reporting the results by voice reports. Accordingly, the user (pedestrian) is able to find out the distance and direction to the destination location without having to carry a device intended only for navigation purposes.

The present navigation system provides transmission of voice reports also, for guiding the user to move from a present location to a destination location through ubiquitous public telephones by receiving location information for the present location and the destination location transmitted through a public digital phone based on the DTMF signals, obtaining the longitudinal and latitudinal data, and computing the distance and direction of move from the present location to the destination location, and reporting the results by voice reports. Accordingly, the user (pedestrian) is able to receive navigation service to move to a destination location without having to carry a device intended only for navigation purposes.

The present navigation system utilizes a telephone number or a postal number as location information for the present location or the destination location. Accordingly, the user only needs to perform simple tasks of pressing keys on the digital phone to enter data on the present and destination locations to the navigation system of the present invention.

Also, the present navigation system includes commercial messages during intervals of navigation service, thereby enabling to bring information in addition to navigation information.

Also, in the present navigation system, commercial messages to be announced to the user are determined on the basis of more than one information that are grouped by rank information, district information or timeband information, thereby providing commercial messages that are highly targeted to potential users of commercial enterprises.

Also, when the transport means selected for the user is a taxi, the present navigation system transmits information necessary for dispatching a taxi to the transport facility terminal device disposed in a taxi dispatching center, thereby enabling the user to obtain a taxi simply by accessing the navigation system.

What is claimed is:

1. A navigation method comprising:

receiving present location information and destination location information communicated over a telephone network from a telephone using dual-tone multi-frequency signals;

using the received present location information and destination location information, and latitude and longitude information stored in a latitude/longitude memory section to automatically obtain latitude and longitude information regarding the present location and the destination location;

automatically determining one or both of a distance and direction between the present location and the destination location based on the automatically obtained latitude and longitude information;

automatically transmitting over the telephone network to the telephone a voice message reporting the automatically determined distance and/or direction;

using the automatically determined distance and/or direction, and transportation facilities information stored in a transportation facilities memory section to determine a route from the present location to the destination location;

transmitting to the telephone over the telephone network a voice message reporting the determined route;

receiving route selection information communicated from the telephone using dual-tone multi-frequency signals; and transmitting over the telephone network to a taxi dispatch facility taxi dispatch information if the route selection information selects a route at least partly requiring taxi transportation, wherein the stored transportation facilities information comprises at least taxi information.

2. A navigation method according to claim 1, wherein the stored transportation facilities information further comprises train information.

3. A computer-readable medium having computer-executable instructions for performing the steps recited in claim 1.

* * * * *